June 30, 1970          G. H. TRIPP          3,517,940

CHUCKS

Filed Oct. 21, 1966

Guy H. Tripp
INVENTOR.

United States Patent Office 3,517,940
Patented June 30, 1970

3,517,940
CHUCKS
Guy H. Tripp, 209 N. Columbian Road,
Bay City, Mich. 48706
Filed Oct. 21, 1966, Ser. No. 597,827
Int. Cl. B23b 5/22
U.S. Cl. 279—55                              3 Claims

ABSTRACT OF THE DISCLOSURE

This invention is to a chuck of the self-centering type which can be employed with tools having both tapered and cylindrical shanks.

---

This invention relates to chucks and more specifically provides a device for attaching to a lathe, drill press, screw machine, automatic or similar machine having a rotating output shaft wherein the present invention may be utilized to securely clamp tools, work pieces, bar stock, tubing or work for rotation thereof.

An object of this invention is to provide a chuck having an improved and novel structure including a multiplicity of radially and axially movable jaws circumferentially spaced in gripping and ungripping position and will work in either direction or stationary when the work is rotating.

Another object of this invention is to provide a chuck which is extremely simple and easy in construction and easy and quick to operate the gripping and ungripping action, especially, when operated with air, hydraulically or electrically. It is well adapted for its intended purpose, is quite inexpensive to manufacture and almost no expense to maintain.

A further object of this invention is to provide a chuck that always conforms to the work to be held whether taper or straight.

Yet another object of this invention is to provide a multiplicity of free floating jaws moving radially and axially into gripping action and ungripping action, means being provided for accomplishing said gripping and ungripping action and at the same time holding said jaws in unison radially, axially and linearly whether gripping in a taper, parallel or any position within the capacity of the herein described chuck. Said jaws are provided with a multiplicty of tapers arranged to coact with the body annular cam and movable annular cam and means are provided for instantaneous action, also means to hold jaws in a normal outward position.

These objects together with other objects and advantages will become subsequently apparent as they reside in the details of construction and operation of the chuck as more fully hereinafter described and claimed, reference being made to the accompanying drawings forming a part thereof wherein like numerals refer to like parts throughout.

Figure 1:
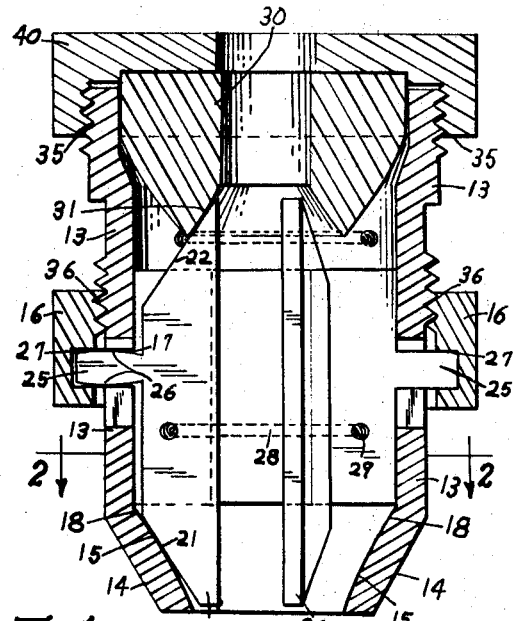
FIG. 1 is a cross-sectional view of an embodiment of my invention.
Figure 2:
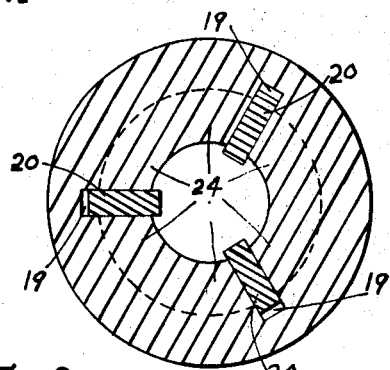
FIG. 2 is a cross-section taken at 5—5 of FIG. 4.
Figure 3:
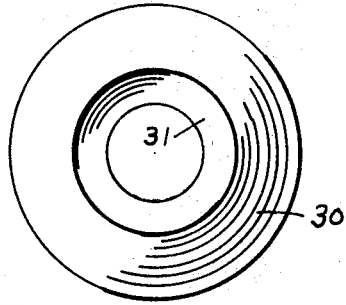
FIG. 3 is a view of cone 30 in FIG. 4 used for locking jaws in holding position when work is clamped by jaws.

The chuck body 13 is a rigid one piece construction having an inward flared conical shape 14 at one end, the opposite end being externally threaded to engage the internal threads in the thimble sleeve nut 40, as at 35 in FIG. 1, and having a central counter bore 12 which is parallel with the longitudinal axis of the body 13. The interior of the chuck body 13 contains a multiplicity of circumferentially spaced guide ribs 24, being a part of the body 13, and parallel to the longitudinal axis of the body 13 and extending inward toward the center, as depicted in FIG. 2. A multiplicity of sets of strong rigid jaws 20 are disposed in grooves 19, which are formed by the guide ribs 24, the jaws 20 being restrained from lateral movement thereby. The interior wall of the cone shaped end 14 of the body 13 has an arcuate shaped surface 18 on annular cam 15, the interior wall of the opposite end is so shaped as to be in close relation to the movable cone 30 which is controlled by the thimble nut 40 and has an inner arcuate cam surface 31. Slots 17 are constructed in and extending through the body 13 intermediate the ends of the body 13, allowing ample space for the axial travel of ears 25 on the jaws 20 each slot 17 being in alignment with each groove 19 and the ear 25 on the jaw 20 contained therein. External threads are constructed on the body 13 adjacent the slots 17 to engage the internal threads of annular nut 16, as at 36 FIG. 1, which has an annular groove 27 in alignment with ears 25 thus holding the jaws 20 even axially in relation to each other. The jaws 20 are constructed with ears 25 having an arcuate shape 26, the ears 25 being confined within the slots 17 in the body 13 and grooves 27 in the annular nut 16. The ears 25 on the jaws 20 take an arcuate shape 26 to accommodate the movement of the jaws 20 as they move from the straight gripping position, that is parallel to the longitudinal axis of the body 13, to the taper gripping position. It can be seen that the ends of the ears 25 on the jaws 20 must move up and down while the middle of each of the jaws 20 is practically stationary, the ends of the ears 25 being held securely in the annular groove 27 in the annular nut 16 thus holding the jaws even axially. The annular nut 16 can take the shape of a smooth annular ring and can be automatically actuated by air, hydraulic or electrical mechanisms. The jaws 20 have tapers 21 to coact with the arcuate surface 18 of inner annular cam 15; tapers 22 on jaws 20 are contacted by inner arcuate annular cam surface 31 of cone 30. An annular spring 28 through the holes 29 in jaws 20 hold the jaws 20 in an outward position in relation to the longitudinal axis of chuck body 13 at the end of the chuck that receives the work piece. The inner arcuate annular cam 31 of the movable cone 30 engages the tapers 22 of the jaws 20.

When the annular nut 16 is moved forward away from the thimble nut 40, it forces the jaws 20 into a clamping and locking action, then the cone 30 which is in close relation to counter bore 12 and movable therein is actuated by the thimble sleeve nut 40 causing the cam surface 31 on movable cone 30 to engage the tapers 22 on jaws 20 thus locking the jaws 20 linearly centrally and in exact unison axially. The reverse action unlocks the jaws 20 and allows them to move into ungripping position through the action of the springs 28.

FIG. 7 is a view of the side elevation of the invention constructed in accordance with the present invention and having a taper work piece shown within the gripping jaws, FIG. 7, as the jaws will conform to either taper or straight work pieces.

FIG. 8 is a sectional view taken substantially along the plane at 8—8 of FIG. 7 showing the details of construction and assembly of the chuck of the present invention.

The chuck body 50, shown in FIG. 7, is a rigid one piece construction having an inward flared conical shape 51 at one end, the inner surface of the same end being an arcuate shaped annular cam 52, and having a central bore 53 which is parallel with the longitudinal axis of the body 50. A multipilicity of grooves 55 are machined on the interior of the chuck body 50 and are circumferentially spaced thus forming a multiplicity of ribs 54 which are parallel to the longitudinal axis of the chuck body 50 and extend inward toward the center as shown in FIG. 8. The grooves 55 accommodate a multiplicity of sets of strong rigid elongated jaws 56 which are restrained from lateral movement thereby. Slots 64 are constructed in body 50 passing through the body 50 in alignment with the grooves 55 to accommodate the extension of tapers 57 and 58 on jaws 56. The exterior of the body 50 is threaded adjacent the slots 64 to engage the threaded cam rings 60 and 61. The cam rings 60 and 61 both have arcuate annular cam surfaces at 62 and 63. A counter bore 67 is constructed in the large end of the chuck body 50 to hold the shank in place, but this end of the body 50 can be left open to allow bar stock to pass through when used in a lathe or is nested for automatics, screw machines etc. The elongated jaws 56 are machined to have three tapers, taper 59 to coact with arcuate annular cam 52 on cone end 51 of body 50, taper 57 to coact with arcuate annular cam 62 on cam ring 60 and taper 58 to coact with arcuate annular cam 63 on cam ring 61. Holes are constructed in jaws 56 to accommodate springs 65 and 66. The tapers 58 and 59 on the jaws 56 should be parallel.

The jaws 56 are urged into gripping action by means of the threaded cam rings 60 and 61 and the arcuate annular cam 52 coacting with the tapers 57, 58 and 59 on the jaws 56, the arcuate annular cam 62 on the cam ring 60 coacting with the tapers 57 on the jaws 56 and the arcuate annular cam 63 on the cam ring 61 coacting with the tapers 58 on the jaws 56 is the means of clamping and locking the jaws 56 into exact position linearly and centrally. It will be observed that on each jaw 56 the face of the taper 58 is parallel to the face of the taper 59 so that the movement of the jaws 56 through the action of the annular cam rings 61 and the arcuate annular cam 52 will coordinate while pressure on the end of the jaws 56 at the large end of the body 50 is exerted by the threaded cam ring 60. The jaws 56 can be released by loosening the cam rings 60 and 61 allowing the springs 65 and 66 to pull the jaws 56 away from the work piece.

FIG. 9 shows a sectional view of a flat cam plate to force movement of jaws both axially and radially. This shows another type of cam that can be used and another shape of jaw. 70 is the jaw, 71 is the taper on the jaw 70, 72 is the flat cam, 73 is a sliding cam, 74 is an arcuate surface on the sliding annular cam 73 and 75 is a solenoid.

FIG. 10 shows a sectional view of a closing mechanism for use in automatics, screw machines and in places that need instant closing and opening action. 80 is the jaw, 81 and 82 are tapers on jaw 80, 83 and 84 are sliding cams, cam 83 has an arcuate surface at 85 and cam 84 has an arcuate surface at 86, 87 is a camming device and 88 are rollers between the camming device and the cam rings. When pressure is exerted on camming device 87 in direction of arrow, the cam rings 83 and 84 in turn exert pressure on the tapers 81 and 82 of jaw 80 locking jaw 80 into desired position. The rollers 88 are used between the moving parts to facilitate easy movement, ball bearings can be used instead of rollers.

FIG. 11 shows a sectional view of a side elevation showing an air of hydraulic cylinder and means to operate the two annular cams 94 and 93. 90 is a jaw, 91 and 92 are tapers on jaw 90, 93 and 94 are sliding annular cam rings, cam 93 has an arcuate surface at 95 and cam 94 has an arcuate surface at 96, 97 is a hydraulic or air cylinder, 98 is a piston, 99 is an oscillating lever and 89 is a spring to absorb shock in sudden movement and prevents breakage when the sudden stops occur and also keeps tension the same.

The jaws can take various shapes to match and co-operate with the moving means or to be moved by any annular cams or necessary means which might need to be used, as shown in FIG. 9, the flat cam 72 and the sliding cam 73 engages the jaw 70; in FIG. 10, the sliding cams 83 and 84 engages the jaw 80 and in FIG. 11, the sliding cams 93 and 94 engages the jaw 90. In FIG. 9, the cam ring 73 is actuated by a solenoid 75, in FIG. 10 the cam rings 83 and 84 are actuated by a camming device 87 and rollers 88 and in FIG. 11 the cam rings 93 and 94 are actuated by a hydraulic or air cylinder. It will be noted that the faces of the annular cam rings 60 and 61 in FIG. 7, 73 in FIG. 9, 83 and 84 in FIG. 10 and 93 and 94 in FIG. 11 have arcuate shapes as at 62 and 63 in FIG. 7, 74 in FIG. 9, 85 and 86 in FIG. 10 and 95 and 96 in FIG. 11 for the purpose of having a good bearing to coact with the adjacent tapers of the jaws in each of the aforesaid figures. The chucks shown in FIGS. 9, 10 and 11 can be nested in or on drilling or screw machines or automatics etc. They may also be employed in a tool or machine including the chuck being held stationary or rotating. The construction of this chuck gives a high degree of accuracy in guiding the jaws in their gripping action.

The expression "longitudinal axis of the body" means an axis extending lengthwise of the body symmetrically in relation to the body of the chuck and around which the chuck rotates when mounted on a rotatable member.

It will be understood that suitable tool steel or like material may be used in the present invention wherein this chuck will permit clamping the tool on a lathe, drill etc. having a rotatable power output spindle. It can be seen that the chuck can be used for holding the tool or the work piece. This chuck can be manufactured in a wide range of sizes to accommodate different types of work. It is not desired to limit this invention to the exact construction herein described and shown, so suitable changes and equivalents may be used falling within the scope of the following claims.

What I claim is:

1. A chuck body having a central bore with an internal cone shape at one end and a counter bore at the opposite end, said body member containing a multiplicity of guide ribs circumferentially spaced apart and parallel to the longitudinal axis of said body and forming grooves between said guide ribs, said guide ribs being placed intermediate the cone end and the counter bore end of the interior of said chuck body, a portion of said grooves forming slots extending to the outer surface of said chuck body and in alignment with said grooves, a set of jaws being freely disposed in said grooves and held from lateral movement thereby and being axially and radially movable therein, said jaws having extended ears extending through said slots and beyond the outer surface of said chuck body, said chuck body contains ring means to coact with said ears of said jaws said counterbore and contains a movable cone, a thimble nut at the counter bore end of said chuck body for actuating said movable cone, whereby actuating said ring means and said thimble nut forces said jaws into clamping and unclamping positions which lock said jaws centrally and linearly on work within the capacity of said chuck.

2. In the structure in claim 1, said movable cone moves in close relation to said counter bore, said movable cone coacts with tapers of said jaws and at the same time forces the opposite ends of said jaws at said cone end of said chuck body into a gripping action with work pieces.

3. The structure in claim 1 contains an annular movable ring intermediate the ends of said chuck body, said ring contains an inner annular groove which coacts with said ears on said jaws keeping and holding said jaws even axially and in relation to each other, said ring actuates said jaws into a holding and locking position and unlocking position.

References Cited

UNITED STATES PATENTS 2,822,177   2/1958   Tripp _____ 279—58

ROBERT C. RIORDON, Primary Examiner

D. R. MELTON, Assistant Examiner